July 21, 1964  N. L. KUSTERS ETAL  3,142,015
HIGH VOLTAGE ALTERNATING CURRENT CAPACITIVE MEASURING
APPARATUS USING MAGNETIC CORES
Filed April 2, 1962  2 Sheets-Sheet 1

Inventors
Norbert L. Kusters
Oskars Petersons
By Cushman, Darby & Cushman
attorneys

United States Patent Office 3,142,015
Patented July 21, 1964

3,142,015
HIGH VOLTAGE ALTERNATING CURRENT CAPACITIVE MEASURING APPARATUS USING MAGNETIC CORES
Norbert Leo Kusters and Oskars Petersons, Ottawa, Ontario, Canada, assignors to National Research Council, Ottawa, Ontario, Canada, a corporation of Canada
Filed Apr. 2, 1962, Ser. No. 184,244
15 Claims. (Cl. 324—60)

This invention relates to high voltage alternating current capacitive measuring apparatus and is for convenience referred to as a bridge, although it is not a bridge in the conventional sense. It is especially useful for comparing and calibrating capacitors at high voltage.

At present the only high voltage capacitance bridge commercially available is the Schering bridge in which the same high voltage is applied to the unknown capacitor and a reference capacitor and the currents flowing in each are compared by measuring the voltage drop across calibrated resistance arms connected in series with the capacitors. Phase adjustment is provided in the form of a shunt capacitance across one of the resistance arms.

To realise a high sensitivity in such a bridge, the voltage drop across the resistance arms has to be relatively high. This requires a relatively high value of resistance in the reference capacitor arm. The capacitor is normally of the three terminal type having a shielded low voltage terminal. The capacitance to the shield of the low voltage terminal then shunts the resistance arm, leading to errors in the bridge. This effect on the bridge balance can be eliminated by bringing the shield up to the potential of the bridge balance detector with the aid of an auxiliary balance circuit, but this requires additional equipment.

Moreover, at the operating voltage of these capacitors, a current of several hundred amperes may flow in the associated resistance arm. Power dissipation considerations in this arm then constitute an additional limitation on the sensitivity which can be realised in practice.

Furthermore, the accuracy of a Schering bridge is limited by the accuracy of the resistance ratio arms. Although this accuracy can be quite high in magnitude, the relative phase errors at 60 cycles may be quite high, and are more difficult to adjust. Their control requires elaborate equipment for individually checking each of the component parts.

The primary object of the present invention is to provide a bridge circuit in which the above-mentioned limitations on the accuracy obtainable with a Schering bridge are reduced, and preferably by several orders of magnitude.

To this end the resistance arms of the bridge are replaced by the coils of a current comparator device of the type which consists of a pair of windings (known as primary and secondary windings) mounted on a toroidal or other magnetic core closed on itself to form a magnetic circuit, said windings being so connected as to generate magnetizing forces opposing each other. When the currents are equal (if the windings have an equal number of turns) or, more accurately, when the ampere turns are equal (since the number of turns need not be the same), there will be zero flux in the core. A third, detection winding is connected to a suitable null indicator to show when the balance has been achieved. Thus the circuit is no longer a bridge in the conventional sense; the detection winding, which is coupled magnetically rather than electrically to the primary and secondary windings, replaces the detector that is normally placed across a diagonal of the bridge.

To achieve balance in practice, it is necessary to inject a correction current (usually having both an in-phase and a quadrature component) into the system, and this can be accomplished by means of one or more additional windings (known as deviation windings), or by means of one of the existing (primary or secondary) windings.

The manner of derivation of the correction current is an important aspect of the invention. It is generated by a control potential, which, in turn, is derived from a voltage set up under controlled conditions across an impedance element (preferably a capacitor), which element is arranged in series with the series circuit constituted by one arm of the bridge, that is one of the capacitors being compared connected in series with a primary or secondary winding of the comparator device.

In further illustration of these features, the accompanying drawings show a number of circuits arranged according to the invention. It is to be understood that these illustrations are provided by way of example only and that variations may be made in the invention within the scope of the appended claims.

Figure 1:
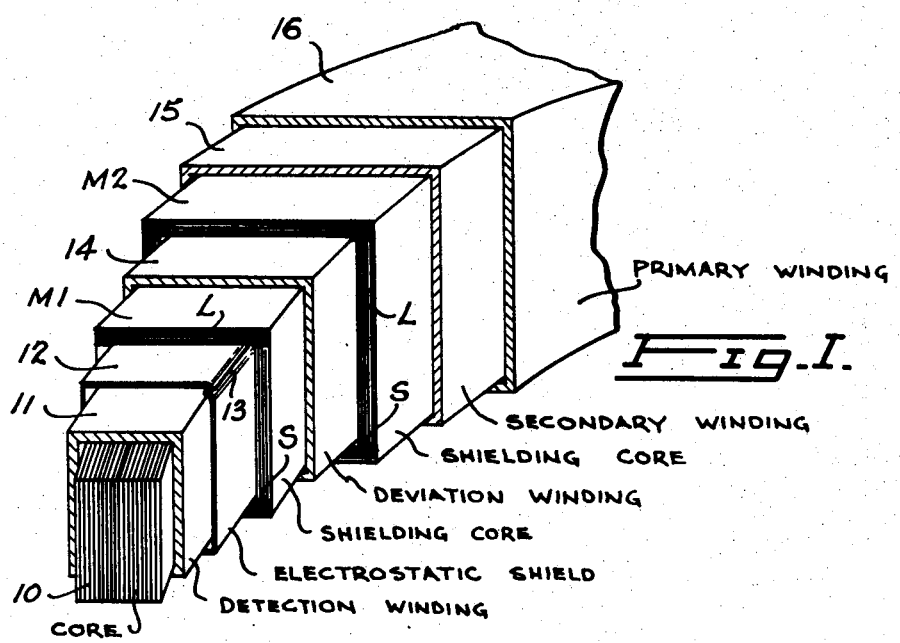
FIGURE 1 shows a diagrammatic cross-section of a current comparator device for use in the present invention.

The current comparator device of which a fragment is shown in FIGURE 1 is toroidal in form and each of the cores shown is assumed to be closed on itself. At the axial centre of the device is a magnetic core 10. In place around the core 10 is a detection winding 11, which will thus indicate flux in the core 10. Immediately radially outwardly of winding 11 there is provided a copper electrostatic shield 12 split along edge 13 in the usual way to avoid a shorted turn. This shield 12 protects the detection winding 11 from interference from stray electric fields. Although not absolutely essential, the shield 12 is most desirable, if high accuracy is to be obtained, unless the external circuit can be so arranged that the mean potential of each of the conductors threading the device is ground, which is seldom convenient.

There is then provided a first shielding magnetic core M1 formed of laminations L and at least one spacer S to avoid a short circuited turn. A deviation winding 14 is in next position. As will appear from the circuits described below the deviation winding may not always be required. In such cases it will be omitted, when the first shielding core M1 will normally also be omitted. There is then provided a second shielding magnetic core M2 similar to shield M1. Radially outwardly of the shield M2, are positioned the two main windings, secondary 15 and primary 16. The relative positions of windings 15 and 16 are interchangeable, and, if the second shielding core M2 is omitted, the positions of all three windings 14, 15 and 16 are interchangeable.

In practice, additional shielding may be provided, as found desirable. Such features have been omitted from the drawing, since the present description is concerned with the fundamental principles of circuit operation rather than with practical constructional considerations. With regard to the functions of the shielding cores M1 and M2, attention is directed to copending application of Kusters et al. Serial No. 173,895, filed February 19, 1962, in which these functions are discussed in detail.

Figure 2:
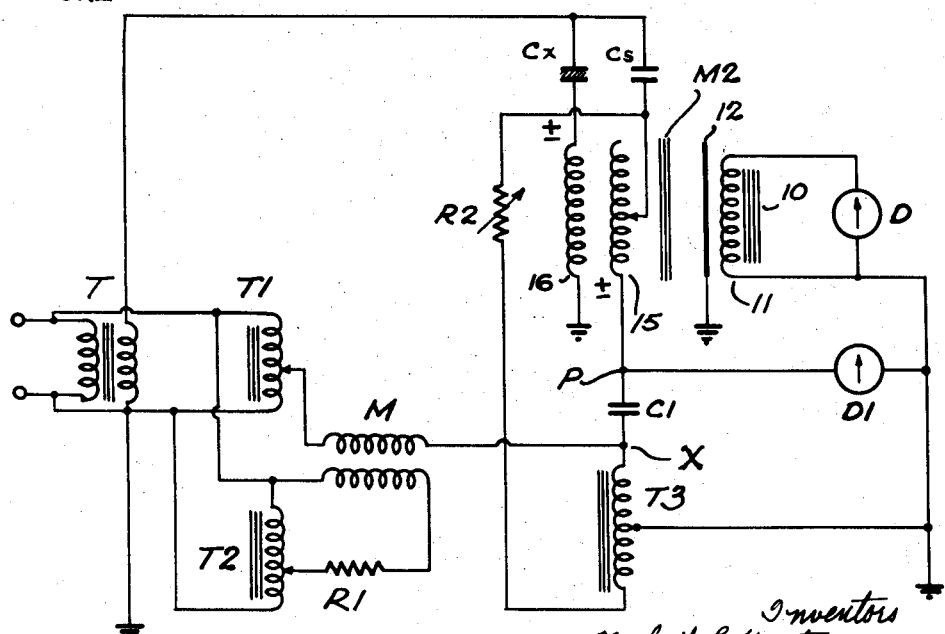
FIGURE 2 is a first bridge circuit according to the invention.

FIGURE 2 shows a first bridge circuit employing this comparator device but without a deviation winding and associated shielding core M1. The primary and secondary windings 16 and 15 are respectively series connected with an unknown capacitor $Cx$ under test (assumed to be lossy) and a standard capacitor $Cs$ (assumed to be lossless). The series circuits so formed are each connected at one end to an alternating potential derived from the high voltage terminal of a supply transformer T. The other terminal of transformer T is connected to ground which constitutes a reference potential. The detection winding 11 is connected across a null detector D.

One or both of the windings 15 and 16, in this case the secondary winding 15, is assumed to be tapped for changing the turns ratio, and coarse adjustment of the in-phase components can be obtained in this way. The ± signs at the ends of the windings of FIGURE 2 indicate the relative polarity, that is, that the currents in the two windings always flow in opposition to each other.

The correcting voltage for phase adjustment is obtained from two variable transformers T1 and T2, one component being turned through 90° in mutual inductor M before the resultant is applied at junction point X to one side of a third capacitor C1, the other side of which is connected to the secondary winding 15. A current limiting resistor R1 is included in the supply from transformer T2 to the inductor M. Capacitor C1 has a small impedance (for example, a capacitance of a thousand times) in comparison with the impedance of capacitor $Cs$. A second null detector D1 is employed, connected between ground and the junction point P between winding 15 and capacitor C1. A further transformer T3, divided into two equal halves with the center tap grounded, is connected at one end to point X, and at the other end through variable resistor R2 to the point common to the secondary winding 15 and capacitor $Cs$.

The most important feature of this circuit is believed to lie in the dual function of the capacitor $Cs$. Firstly, it functions as the standard capacitor for balancing the bridge; secondly in conjunction with capacitor C1 it serves as a voltage divider. Since capacitor C1 has a large capacitance compared with that of capacitor $Cs$, the great proportion of the impedance in the series circuit extending from the high voltage side of the secondary of supply transformer T through capacitor $Cs$, winding 15 and capacitor C1 to the point X is to be found in the capacitor $Cs$. The impedance of the winding 15 can be ignored. Almost all the voltage drop occurs across the capacitor $Cs$, while a low voltage supply is obtained across capacitor C1 which is accurately proportional to the high voltage supply (in the ratio of the capacitances of the two capacitors), and is accurately phase locked with such supply.

This ready source of an accurately controlled low voltage renders practicable the obtaining of a correction current without resort to such difficult expedients as calibrated taps on the supply transformer secondary, or the provision of a tertiary low voltage winding on the supply transformer, the phase and magnitude of the voltage in which in relation to that in the secondary has to be known to a high degree of accuracy.

Under the conditions described in the circuit of FIGURE 2, there could be say approximately one volt across capacitor C1 and a similar voltage, but opposite in phase, across the upper half of the transformer T3 to ground. This will induce a similar voltage of opposite signal across the lower half of transformer T3 to ground, which voltage is applied through variable resistor R2 to the secondary winding 15. Transformer T3 thus functions as a phase inverter.

To strike a balance, firstly the voltage source constituted by the transformers T1 and T2 and inductor M is adjusted manually until detector D1 reads zero. This means that the point P has been brought to ground potential by feeding a voltage of the correct magnitude and phase to the point X, that the voltage drop across the upper half of transformer T3 is exactly equal and opposite to the voltage drop across capacitor C1. The bridge now sees the circuit as if the lower end of winding 15 were connected to ground, and the impedance of the components below point P do not enter into the bridge balance equations. Consequently no error arises in the measurements due to such impedance. This is the reason for bringing point P to ground potential. Both the lower ends of windings 15 and 16 are then at the same potential. And yet the series circuit of capacitors $Cs$ and C1 continues to perform its voltage dividing function. Then the value of resistor R2 and, if necessary, the tap on winding 15 are adjusted until detector D reads zero. Further adjustment is made, if necessary, to rectify any effect of the second adjustment on the first.

It should be noted that the capacitor C1 could be replaced by another form of impedance element, a resistor for example, but a capacitor is preferred.

Figure 3:
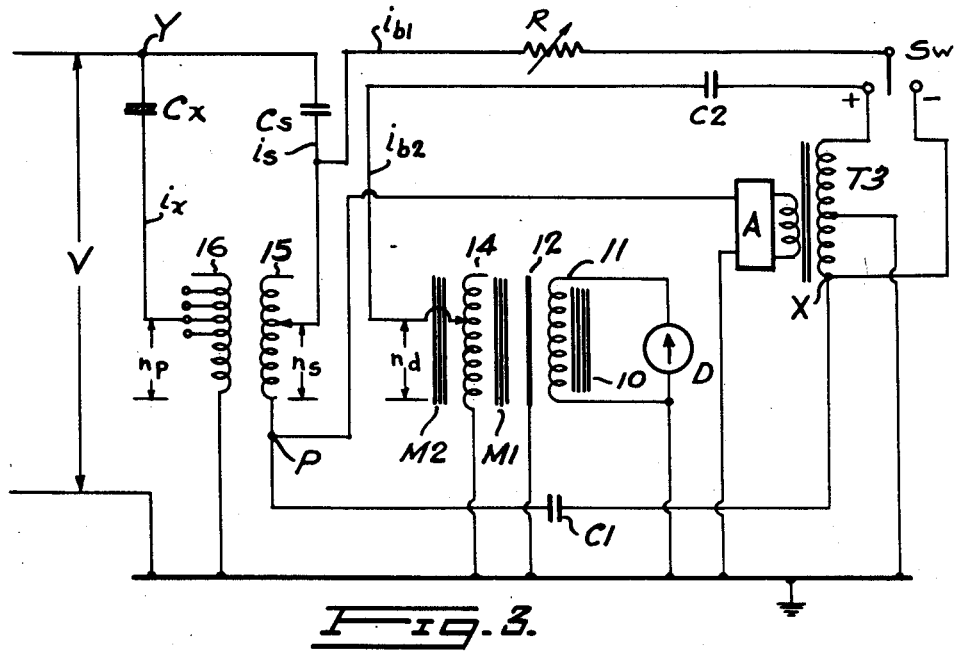
FIGURE 3 is a second bridge circuit according to the invention.

In FIGURE 3, both primary and secondary windings 15 and 16 are tapped. Transformer T3 is provided, as before, only in this circuit the need for the manual adjustments previously made to the voltage source is avoided by means of an amplifier A which is a feedback amplifier with high gain having its input connected between the point P and ground. Its output is applied to transformer T3 to act therewith to constitute the voltage source. In this way the amplifier A maintains its own input point P at ground potential, thus duplicating automatically the first balance previously achieved when detector D1 (FIGURE 2) was brought to zero. Then, as before, the second balance with detector D is achieved by means of adjusting the tap on winding 15 (for coarse in-phase adjustment), by means of the tap on deviation winding 14 supplied through capacitor C2 from one terminal of transformer T3 (for fine in-phase adjustment) and by variable resistor R (for quadrature adjustment). Resistor R is connected through switch Sw to either polarity of the voltage across transformer T3. The taps on winding 16 are provided for range changing. The coarse to fine ratio, that is the effect per turn of adjustments in windings 15 and 14 respectively, is equal to the ratio of the capacitances of capacitors C1 to C2, which is independent of the value of standard capacitor $Cs$, which enables the circuit to be made direct reading.

When detector D shows zero flux in the core 10, the capacitance of the unknown capacitor is given by the equation $$Cx = \frac{Cs}{n_\mathrm{p}}\left(n_\mathrm{s} + \frac{C2}{C1}n_\mathrm{d}\right)$$

where $n_\mathrm{p}$, $n_\mathrm{s}$ and $n_\mathrm{d}$ equal the number of turns in use on the primary, secondary and deviation windings respectively.

The dissipation factor of the unknown capacitor $Cx$ is equal to $$\pm\frac{1}{\omega RC1}$$

The bridge is thus direct reading, provided the instrument employed to obtain the value R is made direct reading in conductance.

Figure 4:
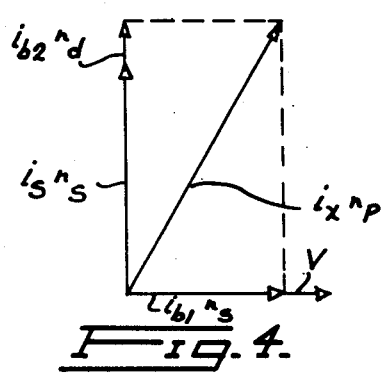
FIGURE 4 is a vector diagram.

FIGURE 4 shows a vector diagram of the conditions in the FIGURE 3 circuit, currents $i_\mathrm{b1}$ and $i_\mathrm{b2}$ being the balancing quadrature and in-phase currents respectively. The reference to in-phase refers to the phase of the current $i_\mathrm{s}$ in the standard capacitor $Cs$, not to the applied voltage V.

The achievement of direct reading in the FIGURE 3 circuit is directly associated with the fact that the potential to ground at point X is equal to $$-V\frac{Cs}{C1}$$

Figure 5:
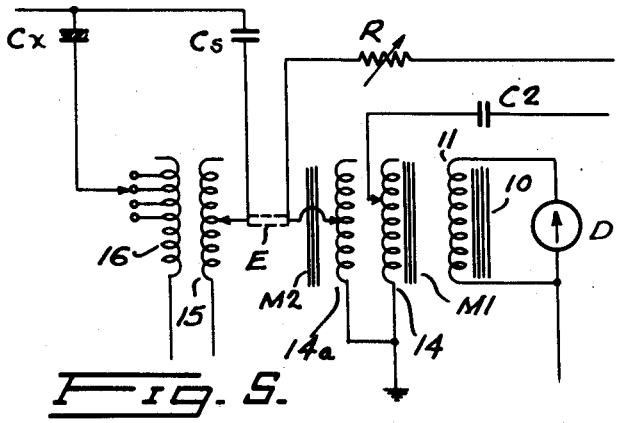
FIGURES 5 and 6 are fragments of circuits illustrating modifications.

V being the applied potential to ground at point Y. This relationship is upset if capacitor $Cx$ has a large loss angle requiring a large quadrature current to be injected through resistor R. The effect of such a large quadrature current on the above relationship can be avoided by injecting the quadrature current into a separate deviation winding 14a as shown in FIGURE 5, the number of turns on winding 14a being the same as, or proportional to, the number of turns on winding 15, and the tap changing mechanisms being mechanically interconnected, as demonstrated by broken lines E. The remainder of the circuit of FIGURE 5 is the same as FIGURE 3.

Figure 6:
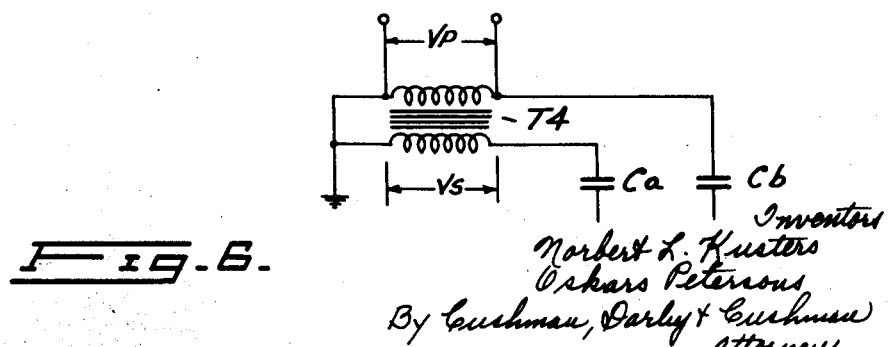

An application of the bridge circuit to the comparison of two voltages is demonstrated in FIGURE 6. Here the two capacitors Cs and Cx previously connected in the bridge arms have been replaced by a pair of capacitors Ca and Cb. By applying the same voltage to these capacitors their relative value can be established by operation of the bridge in one of the manners already described. With these values known, a second balance of the bridge when operated as in FIGURE 6 will establish the magnitude and phase relationship between two voltages, such as the primary and secondary voltages Vp and Vs of a voltage transformer T4 under test. The remainder of the circuit may take the form illustrated in any one of FIGURES 2, 3 or 5.

We claim:
1. Capacitive measuring apparatus comprising
   (a) two capacitors,
   (b) a current comparator device comprising
      (i) a magnetic core closed on itself to form a magnetic circuit,
      (ii) a detection winding around said core,
      (iii) and primary and secondary windings around said core,
   (c) means connecting one of said capacitors in series with one of said primary and secondary windings to form a first series circuit,
   (d) means connecting the other of said capacitors in series with the other of said primary and secondary windings to form a second series circuit,
   (e) means connected to the detection winding for detecting zero output therefrom,
   (f) means connecting a first end of the first series circuit to a first alternating potential predetermined in relation to a reference potential,
   (g) means connecting a first end of the second series circuit to a second alternating potential of the same frequency as said first alternating potential and also predetermined in relation to said reference potential,
   (h) means connecting the second end of the first series circuit to said reference potential to cause a current to flow in the winding of the comparator device in said first series circuit,
   (i) an impedance element having an impedance small compared to the impedance of the capacitor in the second series circuit,
   (j) a source of voltage,
   (k) means connecting a first end of the impedance element to the second end of the second series circuit,
   (l) means connecting the second end of the impedance element to a first side of the voltage source,
   (m) means connecting the second side of the voltage source to said reference potential to cause a current to flow in the winding of the comparator device in said second series circuit,
   (n) the connections being such that said currents flow in opposition to each other to generate only a difference flux in the core,
   (o) means for modifying the output of the voltage source in magnitude and phase to bring the junction between the second series circuit and the impedance element to said reference potential,
   (p) means sensitive to the voltage across the impedance element for generating from such voltage a control potential relative to the reference potential, the magnitude and phase of which control potential is related to the current in the second series circuit,
   (q) and means for generating a correction current from said control potential and for applying said correction current to said comparator device to generate a flux in the core equal and opposite to the difference flux whereby to bring the output of the detection winding to zero.

2. Apparatus according to claim 1 wherein said means for modifying the output of the voltage source comprises
   (a) means sensitive to the voltage between the reference potential and the junction between the second series circuit and the impedance element,
   (b) and means energised by such last-mentioned means for automatically modifying the output of the voltage source to bring the last-mentioned voltage to zero.

3. Apparatus according to claim 2, wherein said means sensitive to the voltage between the reference potential and the junction between the second series circuit and the impedance element comprises an amplifier having its input connected across the reference potential and the last-mentioned junction and its output coupled to a circuit element connected between the second end of the impedance element and the reference potential to constitute said voltage source.

4. Apparatus according to claim 1, wherein said means sensitive to the voltage across the impedance element comprises phase inversion means, the input of which is connected across the reference potential and the junction between the voltage source and the impedance element, and the output of which is said control potential.

5. Apparatus according to claim 1, wherein said impedance element is a capacitor.

6. Apparatus according to claim 4, wherein said impedance element is a capacitor and said phase inversion means comprises a transformer having a first winding part connected across the reference potential and the junction between the voltage source and the capacitor and a second winding part inductively coupled to said first winding part to generate said control potential.

7. Apparatus according to claim 1, wherein said first and second alternating potentials are identical with each other, the magnitude of the correction current then being a measure of the relative phase angles of the capacitors in the series circuits.

8. Apparatus according to claim 1, wherein said first and second alternating potentials are different from each other, the magnitude of the correction current then being a measure of the relative phase angles of such potentials with capacitors of known characteristics in the series circuits.

9. Apparatus according to claim 1, wherein said means for applying the correction current to the comparator device comprise means for feeding said correction current through one of said primary and secondary windings.

10. Apparatus according to claim 1, wherein the comparator device further includes deviation winding means around the core, and wherein said means for applying the correction current to the comparator device comprises means for feeding said correction current through said deviation winding.

11. Apparatus according to claim 1, wherein said current comparator device further includes an electrostatic shield immediately surrounding said detection winding.

12. Apparatus according to claim 1, wherein said current comparator device further includes a shielding magnetic core surrounding said detection winding inwardly of said primary and secondary windings.

13. Capacitive measuring apparatus comprising
   (a) two capacitors,
   (b) a current comparator device comprising
      (i) a magnetic core closed on itself to form a magnetic circuit,
      (ii) a detection winding around said core,
      (iii) an electrostatic shield surrounding said detection winding,
      (iv) a first shielding magnetic core surrounding said electrostatic shield, (v) deviation winding means surrounding said first magnetic shield,
(vi) a second shielding magnetic core surrounding said deviation winding means,
(vii) and primary and secondary windings surrounding said second magnetic shield, (c) means connecting one of said capacitors in series with one of said primary and secondary windings to form a first series circuit,
(d) means connecting the other of said capacitors in series with the other of said primary and secondary windings to form a second series circuit,
(e) means connected to the detection winding for detecting zero output therefrom,
(f) means connecting a first end of the first series circuit to a first alternating potential predetermined in relation to a reference potential,
(g) means connecting a first end of the second series circuit to a second alternating potential of the same frequency as said first alternating potential and also predetermined in relation to said reference potential,
(h) means connecting the second end of the first series circuit to said reference potential to cause a current to flow in the winding of the comparator device in said first series circuit,
(i) a third capacitor having an impedance small compared to the impedance of the capacitor in the second series circuit,
(j) a source of voltage,
(k) means connecting a first side of the third capacitor to the second end of the second series circuit,
(l) means connecting the second side of the third capacitor to a first side of the voltage source,
(m) means connecting the second side of the voltage source to said reference potential to cause a current to flow in the winding of the comparator device in said second series circuit,
(n) the connections being such that said currents flow in opposition to each other to generate only a difference flux in the core,
(o) means sensitive to the voltage between the reference potential and the junction between the second series circuit and the third capacitor,
(p) means energised by such sensitive means for automatically modifying the output of the voltage source in magnitude and phase to eliminate the last-mentioned voltage,
(q) phase inversion means sensitive to the voltage across the third capacitor for generating from such voltage a control potential relative to the reference potential, the magnitude and phase of which control potential is related to the current in the second series circuit,
(r) means for generating from said control potential an in-phase correction current and a quadrature correction current,
(s) and means for injecting said correction currents into said comparator device to generate together a resultant flux in the core equal and opposite to the difference flux whereby to bring the output of the detection winding to zero.

14. Apparatus according to claim 13, wherein said injecting means comprises means for feeding the in-phase correction current into a deviation winding of the comparator device and the quadrature correction current into the winding of the comparator device in the second series circuit.

15. Apparatus according to claim 13, wherein the deviation winding means of the comparator device comprises two deviation windings, and wherein said injecting means comprises means for feeding the in-phase correction current into one deviation winding and the quadrature correction current into the other deviation winding.

No references cited.